US012741358B2

(12) United States Patent
Wueste

(10) Patent No.: US 12,741,358 B2
(45) Date of Patent: Sep. 22, 2026

(54) FEEDING STRUCTURE AND FASTENING DEVICE

(71) Applicant: ATLAS COPCO INDUSTRIAL TECHNIQUE AB, Stockholm (SE)

(72) Inventor: Michael Wueste, Wesel (DE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 494 days.

(21) Appl. No.: 17/921,425

(22) PCT Filed: Apr. 27, 2021

(86) PCT No.: PCT/EP2021/060909
§ 371 (c)(1),
(2) Date: Oct. 26, 2022

(87) PCT Pub. No.: WO2021/219590
PCT Pub. Date: Nov. 4, 2021

(65) Prior Publication Data

US 2023/0191568 A1 Jun. 22, 2023

(30) Foreign Application Priority Data

Apr. 28, 2020 (CN) ........................ 202020677267.5

(51) Int. Cl.
*B25B 23/04* (2006.01)

(52) U.S. Cl.
CPC .................................. *B25B 23/04* (2013.01)

(58) Field of Classification Search
CPC .............................. B25B 23/04; B23P 19/004
(Continued)

(56) References Cited

U.S. PATENT DOCUMENTS 6,550,359 B1 * 4/2003 Graham .............. B25B 27/0014 81/57.37
2023/0191568 A1 6/2023 Wueste

FOREIGN PATENT DOCUMENTS

CN 212686811 U 3/2021
DE 2236696 B1 3/1974
(Continued)

OTHER PUBLICATIONS

Translation of DE10338902 (Year: 2005).*
(Continued)

*Primary Examiner* — Tom Rodgers
(74) *Attorney, Agent, or Firm* — Moore & Van Allen PLLC; W. Kevin Ransom

(57) ABSTRACT

Disclosed is a feeding structure for a fastening device. The feeding structure comprises: a feeding mechanism, one end of which is a feed end, the other end is a discharge end, the feeding mechanism comprises a feed pipe and a conveying pipe that are communicated with each other, a mounting part entering from the feed end can be conveyed to the discharge end through the feed pipe and the conveying pipe. A propulsion mechanism is provided on one side of the feeding mechanism, with a central axis that is parallel to a central axis of the feed pipe. A material receiving portion for communicating the discharge end to receive the mounting part is provided on a shell of the propulsion mechanism, where a propulsion unit action of the propulsion mechanism can push the mounting part conveyed to the material receiving portion and mount same in a target position.

21 Claims, 2 Drawing Sheets

(58) Field of Classification Search
USPC .......................................................... 81/57.57
See application file for complete search history.

(56) References Cited

FOREIGN PATENT DOCUMENTS

| | | | | | |
|---|---|---|---|---|---|
| DE | 3815814 | A1 | * | 11/1989 | ............. B25B 23/04 |
| DE | 3931001 | A1 | | 3/1991 | |
| DE | 3931000 | C2 | * | 11/1996 | ............. B25B 23/04 |
| DE | 10338902 | A1 | * | 3/2005 | ............ B23P 19/006 |
| DE | 102007035958 | A1 | | 2/2009 | |
| EP | 0350370 | A1 | * | 6/1989 | |
| KR | 101883357 | B1 | | 7/2018 | |

OTHER PUBLICATIONS

Translation of DE3931000 (Year: 1996).*
Translation of EP0350370A1 (Year: 1989).*
Translation of DE3815814A1 (Year: 1989).*
Atlas Copco Industrial Technique AB, International Patent Application No. PCT/EP2021/060909, International Search Report, Aug. 4, 2021.
Atlas Copco Industrial Technique AB, International Patent Application No. PCT/EP2021/060909, Written Opinion, Aug. 4, 2021.
Atlas Copco Industrial Technique AB, International Patent Application No. PCT/EP2021/060909, International Preliminary Report on Patentability, Jul. 13, 2022.
Atlas Copco Industrial Technique AB, Chinese Patent Application No. 202180029126.X, Office Action, Aug. 9, 2024.

* cited by examiner

FEEDING STRUCTURE AND FASTENING DEVICE

CROSS-REFERENCE TO RELATED APPLICATIONS

This application is a National Stage Patent Application (filed under 35 § U.S.C. 371) of PCT/EP2021/060909, filed Apr. 27, 2021, of the same title, which, in turn claims priority to Chinese Patent Application No. 202020677267.5 filed Apr. 28, 2020, of the same title; the contents of each of which are hereby incorporated by reference.

FIELD OF THE INVENTION

The present utility model relates to a technical field of mechanical installation, in particular to a feeding structure and a fastening device.

BACKGROUND OF THE INVENTION

The feed pipe of the installation tools such as an existing fastening device is arranged inclinedly in general and occupies a relatively large space. In some installation conditions, due to the limitation of the installation space, the installation of fasteners may be affected; in addition, when the fastening device occupying a relatively large space is used, the use of other components may be affected, thus, it is necessary to use other components after the operation of fastening device is completed. Other examples of known feeding structures are disclosed by for example DE3931001A1 and DE2236696.

SUMMARY OF THE INVENTION

In view of the above problems occurring in the prior art, the present utility model aims to provide a feeding structure and a fastening device that occupies a less space as a whole and that is capable of assembling and fastening the fastener quickly and easily and reducing the impact on other components.

The embodiments of the present utility model provide a feeding structure, which comprises a feeding mechanism, one end of which is a feed end, the other end of which is a discharge end, the feeding mechanism comprises a feed pipe and a conveying pipe that are communicated with each other, a mounting part entering from the feed end can be conveyed to the discharge end through the feed pipe and the conveying pipe;

a propulsion mechanism provided on one side of the feeding mechanism, a material receiving portion for communicating with the discharge end to receive the mounting part is provided on a shell of the propulsion mechanism, and a propulsion unit action of the propulsion mechanism can push the mounting part conveyed to the material receiving portion and mount same in a target position, a central axis of the propulsion mechanism is parallel to a central axis of the feed pipe.

In some embodiments, the feed pipe and the conveying pipe are connected through a bending pipe joint, which is fixed outside the shell of the propulsion mechanism, one end of the bending pipe joint is fixedly connected to the feed pipe, and the other end of the bending pipe joint is movably connected to the conveying pipe, which is oscillated relative to the propulsion mechanism under the action of the propulsion mechanism.

In some embodiments, the other end of the bending pipe joint is of a cylindrical structure, and an opening is provided on the cylindrical structure along an oscillating direction of the conveying pipe, so that the conveying pipe can oscillate via the opening.

In some embodiments, an angle between a central axis of the cylindrical structure and a central axis of the propulsion mechanism is 25 to 30 degrees.

In some embodiments, a through hole for communicating with the discharge end is provided on an outer wall of the material receiving portion, when the propulsion unit is working, the propulsion unit can push against the conveying pipe to oscillate the conveying pipe, so as to separate a port of the discharge end from the through hole and to block the port.

In some embodiments, a stop part is provided on an outer wall of the material receiving portion, the stop part is formed by extending outwardly along a radial direction of the material receiving portion from a position close to the through hole, when the propulsion unit pushes the conveying pipe to oscillate, the stop part abuts against the port of the discharge end to block the port.

In some embodiments, the feeding structure further comprises a resetting mechanism that is provided at the bending pipe joint and that is abutted against the conveying pipe, the resetting mechanism can drive the conveying pipe to reset after the conveying pipe oscillates.

In some embodiments, the resetting mechanism comprises an elastic member and a movable member, one end of the elastic member is fixed, the other end of the elastic member abuts against one end of the movable member, and the other end of the movable member abuts against the conveying pipe, when the conveying pipe oscillates, the conveying pipe acts on the movable member to compress the elastic member, and when an external force is withdrawn, the conveying pipe having oscillated to a certain position is reset by means of resetting the elastic member.

In some embodiments, the feed pipe is a feed hose.

The embodiments of the present utility model further provide a fastening device, which comprises said feeding structure.

Compared with the prior art, the feeding structure provided by the embodiments of the present utility model can convey the mounting part to a target position corresponding to the propulsion mechanism through the cooperation of the feed pipe parallel to the propulsion mechanism and a conveying pipe arranged at a certain angle to the propulsion mechanism to realize rapid feeding, and the conveying pipe that is parallel to the propulsion mechanism can reduce the overall occupancy space of the assembly unit or assembly robot containing said feeding structure, and it is convenient to use, at the same time, interference with other components can be reduced.

DESCRIPTION OF THE DRAWINGS

In the accompanying drawings which are not necessarily drawn to scale, same reference signs may describe similar components in different views. Same reference signs with letter suffixes or different letter suffixes may indicate different examples of similar components. The drawings generally illustrate various embodiments by way of example but not limitation and serve to explain the disclosed embodiments together with the description and claims. When appropriate, the same reference signs are used in all drawings to refer to the same or similar parts. Such embodiments are illustrative but are not intended to be exhaustive or exclusive embodiments of the present device or method.

REFERENCE SIGNS

1—feeding mechanism, 101—feed end, 102—discharge end, 11—feed pipe, 12—conveying pipe, 121—abutting portion, 13—bending pipe joint, 131—recess; and

2—propulsion mechanism, 21—material receiving portion, 211—through hole, 212—stop part, 22—propulsion unit, 23—shell.

DETAILED DESCRIPTION

In order to make the objectives, technical solutions and advantages of the embodiments of the present utility model clearer, the technical solutions of the embodiments of the present utility model will be described clearly and completely in combination with the drawings of the embodiments of the utility model as follows.

Unless otherwise defined, the technical terms and scientific terms used in the present utility model should be common sense that can be understood by a person of ordinary skill in the art of the embodiments of the present utility model. The "first", "second" and similar words used in the present utility model do not indicate any order, quantity or importance, but are only used to distinguish different components. Similar words such as "comprise" or "contain" and other similar words mean that the element or item appearing before said word covers the element or item or equivalent listed after said word, but does not exclude other elements or items. Similar words such as "connection" or "connected" do not fine physical or mechanical connections, but may include electrical connections, whether direct or indirect. "Up", "down", "left", "right", etc., are only used to indicate relative positional relationship, when the absolute position of the described object changes, the corresponding relative positional relationship may also be changed accordingly.

Figure 1:
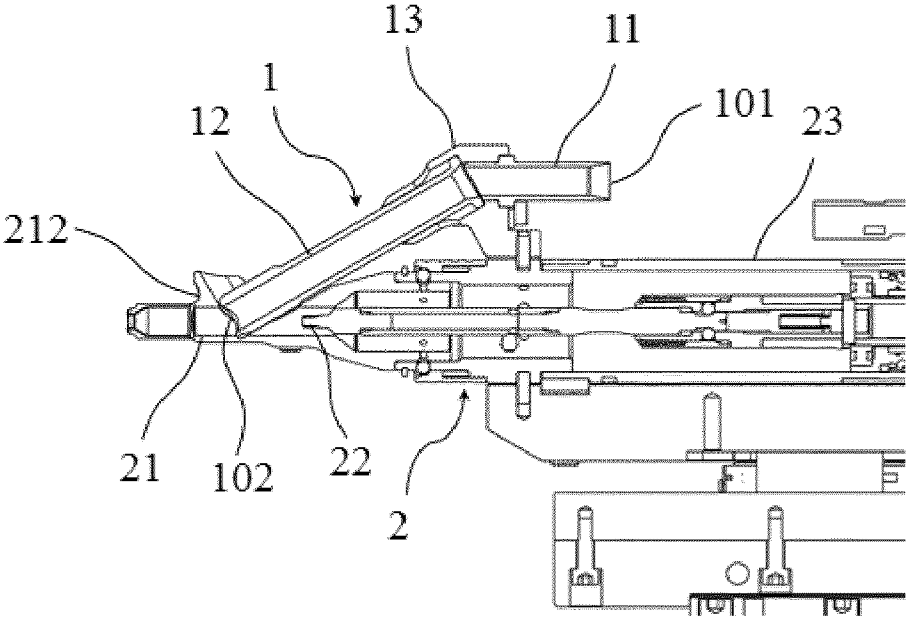
FIG. 1 is a local structural schematic diagram when the feeding structure of the embodiment of the present utility model is in a first state.
Figure 2:
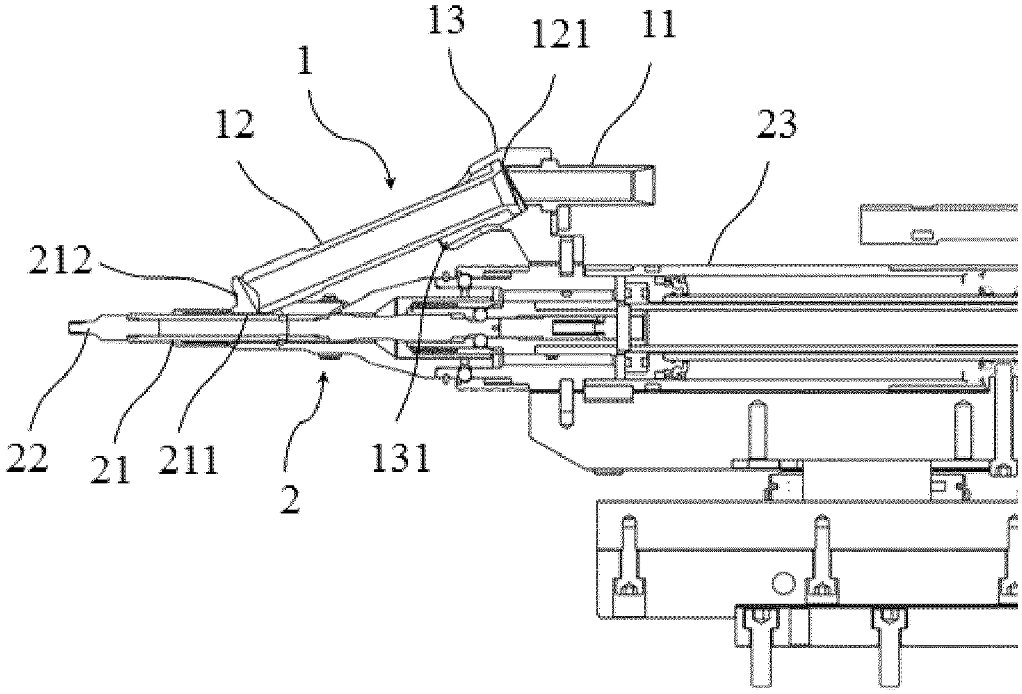
FIG. 2 is a local structural schematic diagram when the feeding structure of the embodiment of the present utility model is in a second state.
Figure 3:
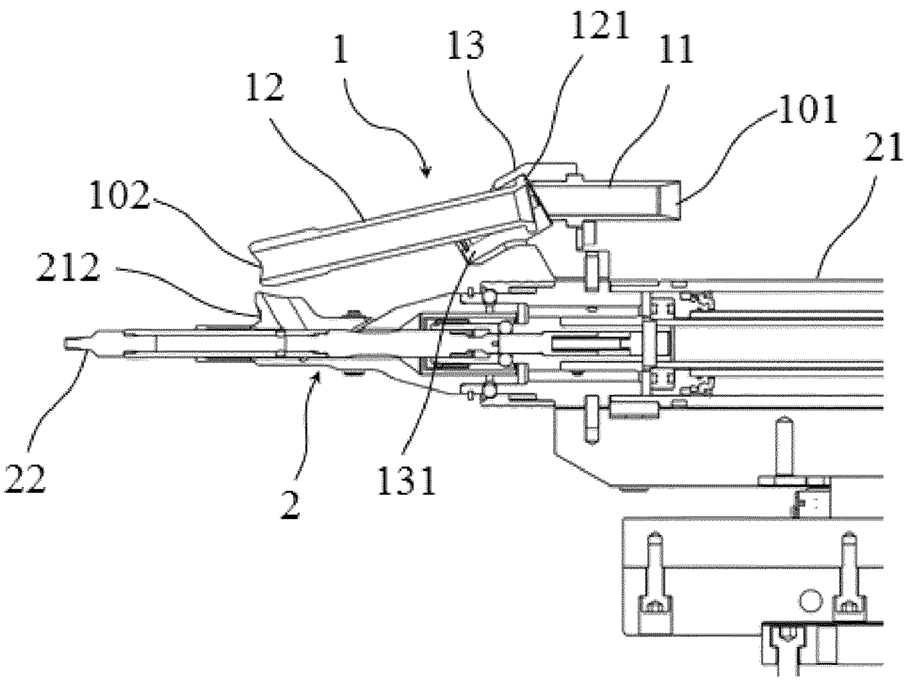
FIG. 3 is a local structural schematic diagram with the conveying pipe and the propulsion mechanism separated from each other when the feeding structure of the embodiment of the present utility model is in a second state.

FIGS. 1 to 3 are structural schematic diagrams of the feeding structure of the embodiments of the present utility model. As shown in FIGS. 1 to 3, the embodiments of the present utility model provide a feeding structure for conveying the mounting part to be assembled to a corresponding position and mounting, the feeding structure comprises:

a feeding mechanism 1, one end of which is a feed end 101, the other end of which is a discharge end 102, the feeding mechanism 1 comprises a feed pipe 11 and a conveying pipe 12 that are communicated with each other, a mounting part entering from the feed end 101 is conveyed to the discharge end 102 through the feed pipe 101 and the conveying pipe 12; and a propulsion mechanism 2 provided on one side of the feeding mechanism 1, the propulsion mechanism 2 includes a material receiving portion 21 for communicating with the discharge end 102 to receive the mounting part, a propulsion unit 22 action of the propulsion mechanism 2 can push the mounting part conveyed to the material receiving portion 21 and mount same in the target position, a central axis of the propulsion mechanism 2 is parallel to a central axis of the feed pipe 11.

Specifically, the mounting part fed from the feed end can fall into the material receiving portion 21 sequentially via the feed pipe 11 and the conveying pipe 12 and can be aligned with the target position, so that a subsequent propulsion unit 22 action pushes the mounting part and mounts same in a target position. When the feeding mechanism 1 is feeding, the feeding structure is in a first state and the propulsion unit 22 is stationary; when the propulsion unit 22 action mounts the mounting part conveyed to the material receiving portion 21, the feeding structure is in a second state.

The feeding structure provided by the embodiments of the present utility model can convey the mounting part to a target position corresponding to the propulsion mechanism 2 through the cooperation of the feed pipe 11 parallel to the propulsion mechanism 2 and the conveying pipe 12 arranged at a certain angle with the propulsion mechanism 2 to realize rapid feeding, and the feed pipe 11 parallel to the propulsion mechanism 2 can reduce the overall occupancy space of the assembly unit or assembly robot containing the feeding structure, and it is convenient to use, at the same time, interference with other components can be reduced. The present utility model has a wide range of applications, in particular, it can be adapted to the installation of mounting parts when the assembly unit or the assembly robot is limited by space.

In some embodiments, as shown in FIGS. 1 to 3, the feed pipe 11 and the conveying pipe 12 are connected through a bending pipe joint 13, which is fixed outside a shell 23 of the propulsion mechanism 2, one end of the bending pipe joint 13 is fixedly connected to the feed pipe 11, the other end of the bending pipe joint 13 is movably connected to the conveying pipe 12, which is capable of oscillating under the action of the propulsion mechanism 2 relative to the propulsion mechanism 2.

In the present embodiment, the mounting part can be a fastener such as a screw, the propulsion unit 22 of the propulsion mechanism can screw the screw fed to the material receiving portion 21 by the feeding mechanism 1 into a target position along its axial direction. As shown in FIG. 2, when a first fastener to be fastened is conveyed to the material receiving portion 21, the propulsion unit 22 of the propulsion mechanism 2 moves forward to the first fastener (target position), and a side wall of the propulsion unit 22 can act on the material conveying pipe 12 to make it oscillate and offset relative to the propulsion mechanism 2, and the propulsion unit 22 action screws the first fastener into a target position; as shown in FIG. 1, after the fastening of the first fastener is completed, the propulsion unit 22 moves backward, the propulsion unit 22 is separated from the conveying pipe 12 and the interaction therebetween is released, the conveying pipe 12 oscillates reversely to reset, so that a second fastener falls into the material receiving portion 21 for the next fastening, which backs and forths to install different fasteners continuously, thus improving the efficiency of installation and fastening.

In some other embodiments, the mounting part can also be an adhesion component, the propulsion mechanism 2 has an adhesion head matched with the adhesion component, the adhesion component of the propulsion mechanism 2 moves toward a target position to adhere the adhesion component conveyed to the material receiving portion 21 and mount same in a target location. For example, an insert can be adhered by the propulsion mechanism 2 having an adhesion head and is placed in a corresponding insert installation groove to realize picking, placing and installing the insert. The type of the mounting part and the specific structure of the propulsion unit 22 are not specifically limited by the present utility model.

The bending pipe joint 13 includes a first connecting section and a second connecting section, which are of cylindrical structures. The inner cavities of the first connecting section and the second connecting section are communicated, a U-shaped opening is provided on the second connecting section along an oscillating direction of the conveying pipe 12, so that the conveying pipe 12 can oscillate via the opening.

In the present embodiment, the feed pipe 11 can be a feed hose, which is detachably installed at the first connecting section. The feed pipe 11 can be screwed into the first connecting section directly via a threaded connection to facilitate disassembling. The feed hose is used to adjust the angle of the feed pipe 11 according to the actual situation, so as to meet the installation requirements of the mounting part in special situations.

Further, an angle between a central axis of the second connecting section and a central axis of the propulsion mechanism 2 is 25 to 30 degrees, thereby facilitating falling the mounting part into the material receiving portion 21 smoothly along a feed passage. When the feeding structure is in a first state, the conveying pipe 12 is in a free state, a central axis of the conveying pipe 12 is parallel to a central axis of the second connecting section to facilitate accommodating the part of the conveying pipe 12 close to the feed pipe 11 in the bending pipe joint 13 so as to protect the conveying pipe 12 while having a nice appearance.

In the present embodiment, the feed pipe 11 and the conveying pipe 12 are arranged at a certain angle, when the mounting part is conveyed, buffer can be provided at the connection between the feed pipe 11 and the conveying pipe 12 to prevent the mounting part from falling into the material receiving portion 21 directly to cause damage to an inner wall of the feeding mechanism 1.

In some other embodiments, the conveying pipe 12 can be directly movably connected to the feed pipe 11, one end of the feed pipe 11 extends into the conveying pipe 12, and there is a certain gap between an outer wall of the feed pipe 11 and an inner wall of the conveying pipe 12 to connect the feed pipe 11 in the conveying pipe 12 to the conveying pipe 12 through a rotation shaft, the conveying pipe 12 can oscillate around the rotation shaft without affecting the feeding of the feed pipe 1. At this time, the bending pipe joint 13 can be served as a protective cover to protect the connection between the feed pipe 11 and the conveying pipe 12.

In some embodiments, as shown in FIGS. 1 to 3, a through hole 211 for communicating the discharge end 101 is provided on an outer wall of the material receiving portion 21, when the propulsion unit 22 is working, the propulsion unit 22 can be pushed against a side wall of the conveying pipe 12, so that the conveying pipe 12 oscillates to away from the material receiving portion 21, thus separating a port of the discharge end 102 from the through hole 222 and blocking a port of the discharge end 102 to prevent other mount parts from dropping out of the discharge end 102.

In the present embodiment, the material receiving portion 21 is provided with a through groove penetrating both ends in an axial direction thereof, a central axis of the through groove coincides with a central axis of the propulsion unit 22, and said through groove is aligned with a target position, and the through groove 211 is provided on a side wall of the through groove.

As shown in FIG. 2, a stop part 212 is provided on an outer wall of the material receiving portion 21, and the stop part is formed by extending outwardly along a radial direction of the material receiving portion 21 from a position close to the through hole 211, when the propulsion unit 22 pushes the conveying pipe 12 to oscillate, the stop part 212 abuts against a port of the discharge end 102 to reliably block the port of the discharge end 102.

In particular, the stop part 212 is formed by extending outwardly from a circumferential edge of the through hole 211 along a radial direction of the material receiving portion 21, while ensuring that the discharge end 102 is separated from the material receiving portion 21, a port of the discharge end 102 is blocked reliably.

In some embodiments, the feeding structure further comprises a resetting mechanism (not shown in the figures) that is provided on the bending pipe joint 13 and that is abutted against the conveying pipe 12, the resetting mechanism can drive the conveying pipe 12 to reset to its initial position after the conveying pipe 12 oscillates to prevent it from oscillating randomly and generating collision with the propulsion mechanism 2.

Further, the resetting mechanism comprises an elastic member and a movable member, one end of the elastic member is fixed, the other end of the elastic member is abutted against one end of the movable member, the other end of the movable member is abutted against the conveying pipe 12, when the conveying pipe 12 oscillates, it acts on the movable member, through which the elastic member can be compressed, so as to keep the conveying pipe 12 at a certain oscillating position and reset the conveying pipe having oscillated to a certain position by means of resetting the elastic member when an external force is withdrawn. In the above-described embodiments, an external force by which the conveying pipe 12 oscillates is provided by the propulsion unit 22 of the feeding mechanism 2.

In some embodiments, an annular abutting portion 121 is formed at a position closed to an oscillating center of the conveying pipe 12, the annular abutting portion 121 is provided along an outer peripheral edge of the conveying pipe 12; a groove 131 for mounting the resetting mechanism is provided on an inner wall of the bending pipe joint 13, the movable member is slidably installed in the groove 131. When the propulsion unit 22 moves toward the target position and pushes the conveying pipe 12 to oscillate, the annular abutting portion 121 acts on the movable member to push it to move along the groove 131 and compress the elastic member, so as to keep the conveying pipe 12 in an oscillating position; when the mounting part finishes mounting, the propulsion unit 22 moves toward the direction away from the target position to be separated from the conveying pipe 12, when an external force exerted to the conveying pipe 12 is withdrawn, the elastic member accumulating certain elastic energy is reset to push the movable member to move reversely along the groove 131 and push the abutting portion to oscillate reversely along its oscillating center, thereby driving the conveying pipe 12 to reset by oscillating and going back to an initial position.

As shown in FIG. 3, when an oscillating angle of the conveying pipe 12 is too large, the stop part 212 is difficult to block a port of the discharge end 102, the conveying pipe 12 can be kept at an oscillating position where a port of the discharge end 102 is blocked by the stop part 212 through a resetting mechanism to prevent the mounting part from dropping out of the conveying pipe 12.

In the present embodiment, the resetting mechanism is installed on both sides of the conveying pipe 12, i.e., the grooves 131 are provided on two opposite side walls of the second connecting section, so that the conveying pipe 12 can oscillate steadily. The elastic member can be a spring or an elastic bush and other elastic components; the movable member can be a ball bearing, as the contact area of the rolling bearing is small, the rolling bearing makes a point or line contact motion relative to the abutting portion 121, which moves smoothly and can transmit greater torque to reset the conveying pipe 12 rapidly.

The propulsion unit 2 further comprises a drive unit for driving the propulsion unit 23 to reciprocate along its axial direction, the drive unit is mounted in a shell 23, and an output shaft of the drive unit is connected to the propulsion unit 22. The drive unit can be a driving mechanism such as a drive motor, a drive cylinder or a drive hydro-cylinder.

The present utility model further provides a fastening device comprising said feeding structure, the fastening device can be a screwing fastening means capable of achieving the rapid assembling and screwing of the fastener.

The above embodiments are merely exemplary embodiments of the present utility model and are not intended to limit the present utility model, the protection scope of the present utility model is defined by the claims. A person skilled in the art can make various amendments and equivalent replacements to the present utility model within the spirit and protection scope of the present utility model, and such modifications or equivalent replacements should also be considered as falling within the protection scope of the present utility model.

The invention claimed is:

1. A feeding structure comprising:

a feeding mechanism, one end of which is a feed end, another end of which is a discharge end, the feeding mechanism comprises a feed pipe and a conveying pipe that are in communication with each other, wherein a mounting part entering from the feed end of the feeding mechanism can be conveyed to the discharge end through the feeding pipe and the conveying pipe;

a propulsion mechanism, which is provided on one side of the feeding mechanism and has a central axis that is parallel to a central axis of the feed pipe, the propulsion mechanism comprising a material receiving portion provided on a shell of the propulsion mechanism, for communicating with the discharge end of the feeding mechanism to receive the mounting part, wherein a propulsion unit action of the propulsion mechanism can push the mounting part conveyed to the material receiving portion and mount same in a target position; and a bending pipe joint connecting the feed pipe and the conveying pipe, the bending pipe joint is fixed outside the shell of the propulsion mechanism, wherein the bending pipe joint comprises a body with a central bore, wherein a first end of the bending pipe joint is fixedly connected to the feed pipe, and a second end of the bending pipe joint is movably connected to an end of the conveying pipe, wherein the bending pipe joint further comprises an opening on a side of the body of the bending pipe joint extending from the second end of the bending pipe joint toward the first end of the bending pipe joint, wherein the opening on the side of the bending pipe joint is structured relative to the conveying pipe so as to allow the conveying pipe to oscillate relative to the bending pipe joint through the opening to thereby allow the conveying pipe to move toward and away from the propulsion mechanism under the action of the propulsion mechanism via the opening, and wherein the first end of the bending pipe joint comprises a first connecting section and wherein the feed pipe is screwed into the first connecting section via a threaded connection.

2. The feeding structure according to claim 1, wherein an angle between a central axis of the body of the bending pipe joint and the central axis of the propulsion mechanism is an angle selected from the range of 25 to 30 degrees.

3. The feeding structure according to claim 1, wherein a through hole for communicating with the discharge end is provided on an outer wall of the material receiving portion, such that when the propulsion unit is working, the propulsion unit can push against the conveying pipe to oscillate the conveying pipe, so as to separate a port of the discharge end from the through hole and to block the port.

4. The feeding structure according to claim 3, wherein a stop part located on an outer wall of the material receiving portion, the stop part extending outwardly along a radial direction of the material receiving portion from a position close to the through hole, such that when the propulsion unit pushes the conveying pipe to oscillate, the stop part is abutted against the port of the discharge end to block the port.

5. The feeding structure according to claim 1, wherein the feeding mechanism also comprises a resetting mechanism that is provided on the bending pipe joint and that is abutted against the conveying pipe, such that the resetting mechanism can drive the conveying pipe to reset after the conveying pipe oscillates.

6. The feeding structure according to claim 5, wherein the resetting mechanism comprises an elastic member and a movable member, one end of the elastic member is fixed, another end of the elastic member is abutted against one end of the movable member, and the other end of the movable member is abutted against the conveying pipe, such that when the conveying pipe oscillates, it acts on the movable member to compress the elastic member, and the conveying pipe having oscillated to a center position is reset by means of resetting the elastic member when an external force is withdrawn.

7. The feeding structure according to claim 6 further comprising one or more grooves located on an inner wall of the bending pipe joint, wherein the movable member is slidably installed in the one or more grooves.

8. The feeding structure according to claim 1, wherein the feed pipe is a feed hose.

9. The feeding structure according to claim 1, wherein the bending pipe joint comprises a second connecting section at the second end of the body and wherein the opening is located is provided on the second connecting section along an oscillating direction of the conveying pipe so that the conveying pipe can oscillate via the opening.

10. The feeding structure according to claim 1, wherein the opening in the body of the bending pipe joint is U-shaped.

11. A fastening device comprising a feeding structure, the feeding structure comprising:

a feeding mechanism, one end of which is a feed end, another end of which is a discharge end, the feeding mechanism comprises a feed pipe and a conveying pipe that are in communication with each other, wherein a mounting part entering from the feed end of the feeding mechanism can be conveyed to the discharge end through the feeding pipe and the conveying pipe;

a propulsion mechanism, which is provided on one side of the feeding mechanism and has a central axis that is parallel to a central axis of the feed pipe, the propulsion mechanism comprising a material receiving portion provided on a shell of the propulsion mechanism, for communicating with the discharge end of the feeding mechanism to receive the mounting part, wherein a propulsion unit action of the propulsion mechanism can push the mounting part conveyed to the material receiving portion and mount same in a target position; and a bending pipe joint connecting the feed pipe and the conveying pipe, the bending pipe joint is fixed outside the shell of the propulsion mechanism, wherein the bending pipe joint comprises a body with a central bore, wherein a first end of the bending pipe joint is fixedly connected to the feed pipe, and a second end of the bending pipe joint is movably connected to an end of the conveying pipe, wherein the bending pipe joint further comprises an opening on a side of the body of the bending pipe joint extending from the second end of the bending pipe joint toward the first end of the bending pipe joint, wherein the opening on the side of the bending pipe joint is structured relative to the conveying pipe so as to allow the conveying pipe to oscillate relative to the bending pipe joint through the opening to thereby allow the conveying pipe to move toward and away from the propulsion mechanism under the action of the propulsion mechanism via the opening, and wherein the first end of the bending pipe joint comprises a first connecting section and wherein the feed pipe is screwed into the first connecting section via a threaded connection.

12. The fastening device according to claim 11, wherein an angle between a central axis of the body of the bending pipe joint and the central axis of the propulsion mechanism is an angle selected from the range of 25 to 30 degrees.

13. The fastening device according to claim 11, wherein a through hole for communicating with the discharge end is provided on an outer wall of the material receiving portion, such that when the propulsion unit is working, the propulsion unit can push against the conveying pipe to oscillate the conveying pipe, so as to separate a port of the discharge end from the through hole and to block the port.

14. The fastening device according to claim 13, wherein a stop part located on an outer wall of the material receiving portion, the stop part extending outwardly along a radial direction of the material receiving portion from a position close to the through hole, such that when the propulsion unit pushes the conveying pipe to oscillate, the stop part is abutted against the port of the discharge end to block the port.

15. The fastening device according to claim 11, wherein the feeding mechanism also comprises a resetting mechanism that is provided on the bending pipe joint and that is abutted against the conveying pipe, such that the resetting mechanism can drive the conveying pipe to reset after the conveying pipe oscillates.

16. The fastening device according to claim 15, wherein the resetting mechanism comprises an elastic member and a movable member, one end of the elastic member is fixed, another end of the elastic member is abutted against one end of the movable member, and the other end of the movable member is abutted against the conveying pipe, such that when the conveying pipe oscillates, it acts on the movable member to compress the elastic member, and the conveying pipe having oscillated to a center position is reset by means of resetting the elastic member when an external force is withdrawn.

17. The fastening device according to claim 11, wherein the feed pipe is a feed hose.

18. The fastening device according to claim 11, wherein the bending pipe joint comprises a second connecting section at the second end of the body and wherein the opening is located is provided on the second connecting section along an oscillating direction of the conveying pipe so that the conveying pipe can oscillate via the opening.

19. The fastening device according to claim 11, wherein the opening in the body of the bending pipe joint is U-shaped.

20. The feeding structure according to claim 7 further comprising an annular abutting portion provided along an outer peripheral edge of the conveying pipe and configured to act on the movable member to slide along the one or more grooves and compress the elastic member when the conveying pipe is oscillated away from the propulsion mechanism.

21. The feeding structure according to claim 20, wherein the elastic member, one or more grooves, and the movable member are located at the second end of the bending pipe joint below the annular abutting portion of the conveying pipe, such that as the conveying pipe is oscillated away from the propulsion mechanism, the movable member slides along the one or more grooves in a direction toward the second end of the bending pipe joint to thereby compress the elastic member.

* * * * *